(12) United States Patent
Schauer

(10) Patent No.: US 9,494,806 B2
(45) Date of Patent: Nov. 15, 2016

(54) TRANSPARENT DISK WITH MIRRORED SURFACE

(76) Inventor: Josef Schauer, Hallein (AT)

(*) Notice: Subject to any disclaimer, the term of this patent is extended or adjusted under 35 U.S.C. 154(b) by 287 days.

(21) Appl. No.: 13/980,141

(22) PCT Filed: Jan. 18, 2012

(86) PCT No.: PCT/EP2012/050684
§ 371 (c)(1),
(2), (4) Date: Jul. 18, 2013

(87) PCT Pub. No.: WO2012/098144
PCT Pub. Date: Jul. 26, 2012

(65) Prior Publication Data
US 2013/0308217 A1  Nov. 21, 2013

(30) Foreign Application Priority Data

Jan. 18, 2011  (AT) .................................. A 68/2011

(51) Int. Cl.
| | | |
|---|---|---|
| *G02C 11/02* | (2006.01) | |
| *G02C 7/02* | (2006.01) | |
| *G02B 5/08* | (2006.01) | |
| *G09F 13/16* | (2006.01) | |
| *G02C 7/10* | (2006.01) | |

(52) U.S. Cl.
CPC ............. *G02C 7/021* (2013.01); *G02B 5/0816* (2013.01); *G02C 7/105* (2013.01); *G02C 7/108* (2013.01); *G09F 13/16* (2013.01); *G02C 2202/16* (2013.01)

(58) Field of Classification Search
CPC .................... G02C 7/021; G02C 7/105; G02C 7/108; G02C 2202/16; G02B 1/105; G02B 1/115; G02B 5/0816

USPC ........ 351/51, 159.6, 159.61, 159.62, 159.63, 351/159.64, 159.65; 359/839
See application file for complete search history.

(56) References Cited

U.S. PATENT DOCUMENTS

| | | | | |
|---|---|---|---|---|
| 2,281,101 A | * | 4/1942 | Land ....................... | G03C 9/04 |
| | | | | 359/465 |
| 3,337,341 A | * | 8/1967 | Ryan ...................... | G03B 27/72 |
| | | | | 355/77 |
| 4,315,665 A | * | 2/1982 | Haines ..................... | G02C 7/00 |
| | | | | 351/44 |
| 4,320,939 A | * | 3/1982 | Mueller .................. | G02C 7/108 |
| | | | | 252/582 |
| 4,673,609 A | * | 6/1987 | Hill .................. | B32B 17/10247 |
| | | | | 219/203 |

(Continued)

FOREIGN PATENT DOCUMENTS

| | | | | | |
|---|---|---|---|---|---|
| AT | | 505 720 B1 | | 5/2009 | |
| AT | | 505720 B1 | * | 5/2009 | ........... C03C 17/002 |

(Continued)

OTHER PUBLICATIONS

English machine translation of At 505720 B1.*

(Continued)

*Primary Examiner* — Pascal M Bui Pho
*Assistant Examiner* — Nicholas R Pasko
(74) *Attorney, Agent, or Firm* — Collard & Roe, P.C.

(57) ABSTRACT

A disk made of glass or plastic, which is suitable for transparency. On the disk, reflective surface patterns are provided for advertising purposes. The disk is designed as a composite of multiple individual disks, and one or more reflective regions are provided on each of the individual disks. A method produces the disk.

14 Claims, 3 Drawing Sheets

(56) References Cited

U.S. PATENT DOCUMENTS

Figure 1:
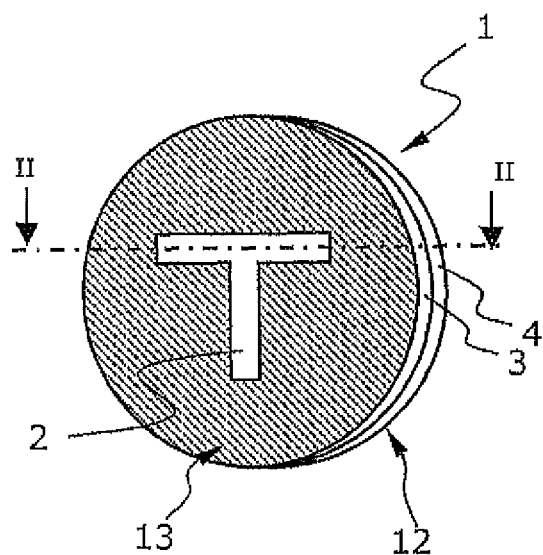

| | | | | |
|---|---|---|---|---|
| 4,715,702 | A * | 12/1987 | Dillon | G02C 11/02 351/159.63 |
| 4,840,444 | A * | 6/1989 | Hewitt | G02C 7/00 359/3 |
| 4,934,792 | A * | 6/1990 | Tovi | G02B 1/10 351/159.62 |
| 4,989,967 | A * | 2/1991 | Matsuda | G02C 7/12 351/159.63 |
| 5,432,623 | A * | 7/1995 | Egan | G03H 1/22 351/41 |
| 5,521,655 | A * | 5/1996 | Rhoad | G02C 11/02 351/51 |
| 6,020,983 | A * | 2/2000 | Neu | G02C 5/00 264/1.1 |
| 6,231,183 | B1 * | 5/2001 | Dillon | G02C 7/02 351/159.6 |
| 6,793,339 | B1 | 9/2004 | Yip et al. | |
| 7,135,217 | B2 * | 11/2006 | Lansberry | B32B 17/10 428/195.1 |
| 7,278,738 | B2 * | 10/2007 | Hsu | G02B 1/11 351/159.62 |
| 7,811,628 | B2 * | 10/2010 | Hsu | C08J 7/065 427/164 |
| 7,955,642 | B2 * | 6/2011 | Hsu | C08J 7/04 427/164 |
| 2005/0018131 | A1 | 1/2005 | Ishak | |

FOREIGN PATENT DOCUMENTS

| | | |
|---|---|---|
| EP | 0 677 764 A1 | 10/1995 |
| GB | 731 661 A | 6/1955 |
| WO | 87/07594 A1 | 12/1987 |
| WO | 99/21048 A1 | 4/1999 |

OTHER PUBLICATIONS

International Search Report of PCT/EP2012/050684, May 9, 2012.
Austrian Search Report in A 68/2011, dated Oct. 18, 2011, with English translation of relevant parts.

* cited by examiner

TRANSPARENT DISK WITH MIRRORED SURFACE

CROSS REFERENCE TO RELATED APPLICATIONS

This application is the National Stage of PCT/EP2012/050684 filed on Jan. 18, 2012, which claims priority under 35 U.S.C. §119 of Austrian Application No. A 68/2011 filed on Jan. 18, 2011, the disclosure of which is incorporated by reference. The international application under PCOT article 21(2) was not published in English.

The invention relates to a disk made of glass or plastic, suitable for allowing a view through it, on which mirrored surface patterns are provided for advertising purposes.

From the state of the art, it is known to apply mirrored surface coatings onto optical disks such as eyeglass lenses made of glass or plastic. These mirrored surface coatings are achieved by means of vapor deposition of interference coatings in a vacuum. Increased interference can occur by means of the selection of the thickness of the vapor-deposited interference coating and of the vapor-deposited material, thereby bringing about a mirror effect. Different reflection colors can be achieved by means of different thicknesses of the interference coatings.

For various application sectors, particularly advertising, it is desirable to provide mirrored surfaces with patterns, symbols, writing, and the like. In this connection, these arrangements are supposed to have only a slight influence on the view through them, while the mirror effect allows the desired pattern to be clearly recognized on the mirrored side.

Application sectors are, for example, sunglasses, eyeglasses, protective glasses, shields on helmets, protective helmets, protective goggles, disks, and films of all types, which are situated in the face region in front of the eyes. In this way, advertising, for example, can be shown even in this region in front of the eyes, and this can be of interest particularly for advertising on TV and in movies, for example in sports events.

Examples for metallic mirrored surface materials are lead, zinc, silver, gold, or aluminum. These are materials that have a higher refraction and deflect the beam of light more strongly than the material of the disk. The mirrored surface material can be covered by a transparent protective coating.

Disks made of glass or plastic, suitable for allowing a view through them, are known from AT 505 720 B1, which have adjacent regions with different mirrored surface colors or mirrored surface intensities on their side facing away from the eyes, forming one or more pattern surfaces. In this connection, the term "facing away from the eyes" refers to that side of the disk that faces away from the eyes of the wearer. The pattern surfaces of the mirrored regions make it possible to represent any desired mirrored patterns on the disk, which are visible from the side of the disk facing away from the eyes, in other words particularly by a viewer.

One problem of these disks consists in that the wearer perceives the applied mirrored regions to be disruptive when looking through the disk. Even the application of a tinted coating or an anti-reflective coating on the side of the disk facing the eyes, as proposed in AT 505 720 B1, does not provide a complete remedy in this regard. Use of such disks is therefore problematic in applications critical to safety.

Accordingly, the technical task of the present invention consists in creating an improved disk with mirrored regions, in which the mirrored regions are clearly recognizable from the side facing away from the eyes, on the one hand, and on the other hand, no disruptions of the view through it are present on the side facing the eyes. It should be possible to produce the disk in easy and simple manner, and it should particularly be suitable for applications critical to safety.

This technical task is accomplished, according to the invention, in that the disk is structured as a composite of multiple individual disks, whereby one or more mirrored regions is/are provided on each of the individual disks.

The wearer of the disk, who is situated on the side of the disk facing the eyes, looks through the composite and therefore through all the mirrored regions. The observer, who is situated on the side of the disk facing away from the eyes, however, notices only the mirrored region applied to the side of the outermost individual disk facing away from the eyes. The wearer and the observer therefore see different patterns: The wearer sees a superimposition of all the mirrored regions, the observer sees only the outermost mirrored region. In that a mirrored region is provided on one of the inside individual disks, which region is a negative image of the mirrored region applied to the outermost individual disk, the result is achieved that the wearer notices practically no inhomogeneities when looking through them. In this way, the stated task according to the invention is accomplished.

According to the invention, it is provided that the mirrored regions of the individual disks do not overlap, and that their combined surfaces cover the entire viewing surface of the disk. In particular, the disk can be structured as a composite of a first individual disk with a first mirrored region and a second individual disk with a second mirrored region, whereby the second mirrored region is the negative image of the first mirrored region.

In this connection, a copy of the region, in each instance, that is enlarged, reduced in size, distorted, or also identical, is understood to be an image. In particular, it can be provided that the mirrored regions of the individual disks, in each instance, overlap at least in certain regions, so that the combination of the mirrored regions covers the entire viewing surface even when looking at it from the side. An overlap region of 1% to 5%, preferably 2% can be provided in this regard. In this connection, the larger region can be provided on the side facing the eyes or on the side facing away from the eyes, depending on the application sector.

Furthermore, it can be provided that the mirrored regions are situated on the sides of the individual disks facing away from the eyes, in each instance. At least one of the individual disks can have a whole-area mirrored surface coating or anti-reflective coating on one side. Accordingly, at least one of the individual disks can also have a whole-area mirrored surface coating or anti-reflective coating on its side facing the eyes.

According to the invention, it is provided that the individual disks are glued, melted, or cemented to one another. Furthermore, it can be provided, according to the invention, that the mirrored regions differ from or contrast with the individual disks in terms of their mirrored surface color and/or mirrored surface intensity.

The adhesive used can particularly be selected in such a manner that it is resistant to UV radiation and to heat variations.

The individual disks can have whole-area mirrored surface coatings on their sides facing the eyes, the intensity of which coatings preferably amounts to maximally 50% of the intensity of the mirrored surface of the mirrored regions.

Furthermore, it can be provided that the individual disks are tinted and/or have a tinted coating under the mirrored regions. Such a tinted coating particularly has the advantage that the mirrored surface shows better (reflects better) in comparison with a non-tinted disk.

One or more of the mirrored surface coatings, anti-reflective coatings, or tinted coatings can furthermore contain fluorescent substances to improve the mirror effect.

In particular, the first individual disk can have a first mirrored region with 70% intensity on its side facing away from the eyes and a whole-area anti-reflective coating on its side facing the eyes, and the second individual disk can have a second mirrored region with 70% intensity on its side facing away from the eyes and a whole-area mirrored surface coating with 70% intensity on its side facing the eyes.

The invention also covers a method for the production of mirrored disks made of glass or plastic, which comprises the following steps:

application of a mask to the surface of a first individual disk facing away from the eyes;
application of a mirrored surface coating to the side of the first individual disk facing away from the eyes;
removal of the mask;
if necessary, repetition of the last three steps with other masks;
if necessary, application of a whole-area anti-reflective coating to the side of the first individual disk facing the eyes;
application of a mask to the surface of a second individual disk facing away from the eyes;
application of a mirrored surface coating to the surface of the second individual disk facing away from the eyes;
removal of the mask;
if necessary, repetition of the last three steps;
if necessary, application of a whole-area mirrored surface coating to the side of the second individual disk facing the eyes;
connection of the first individual disk and the second individual disk by means of gluing, melting, or cementing.

If necessary, one or more tinted coatings can be applied before application of the mirrored surface coatings or anti-reflective coatings.

Further characteristics according to the invention can be derived from the description, the drawings, and the claims.

Figure 2A:
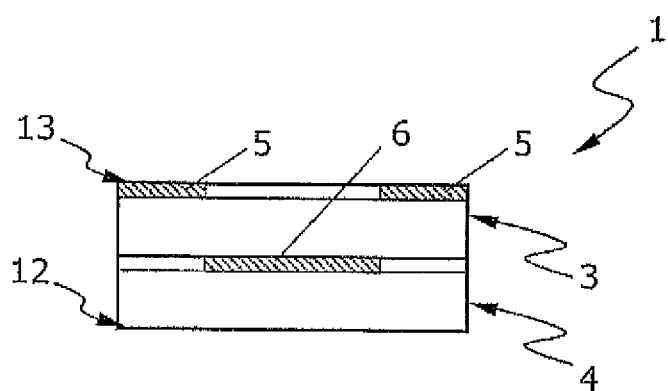
Figure 2B:
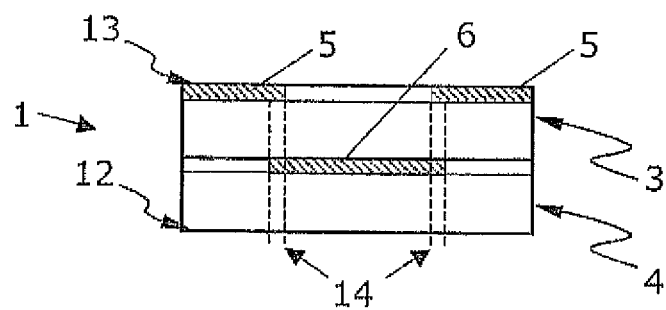
Figure 3:
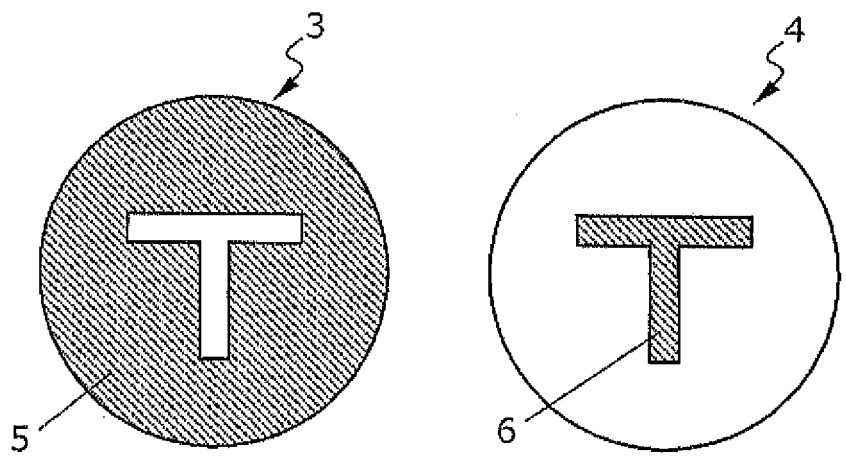
Figure 4:
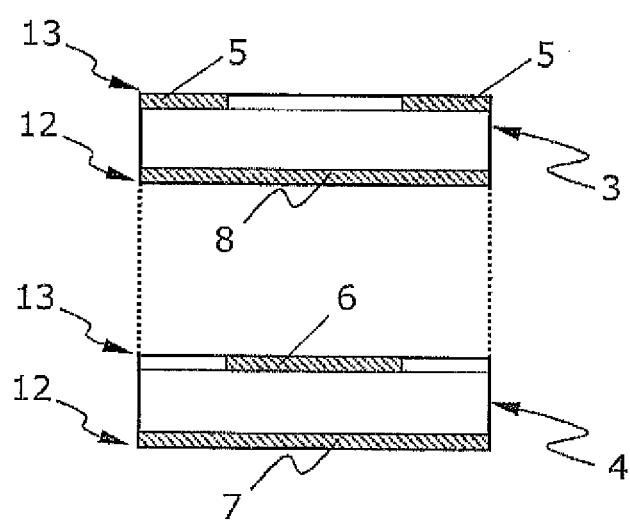
Figure 5A:
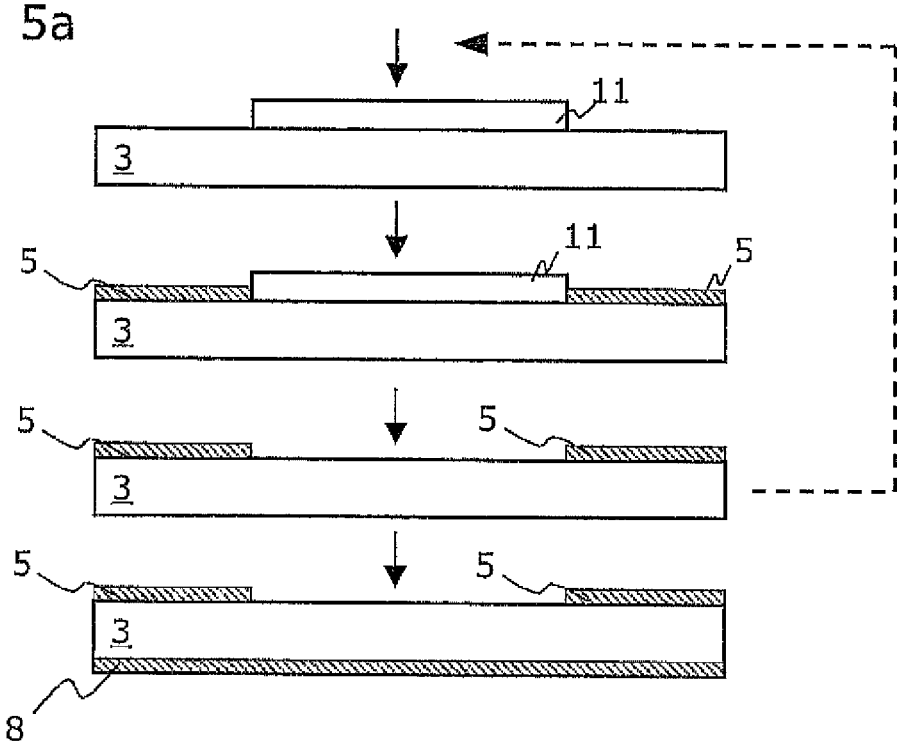
Figure 5B:
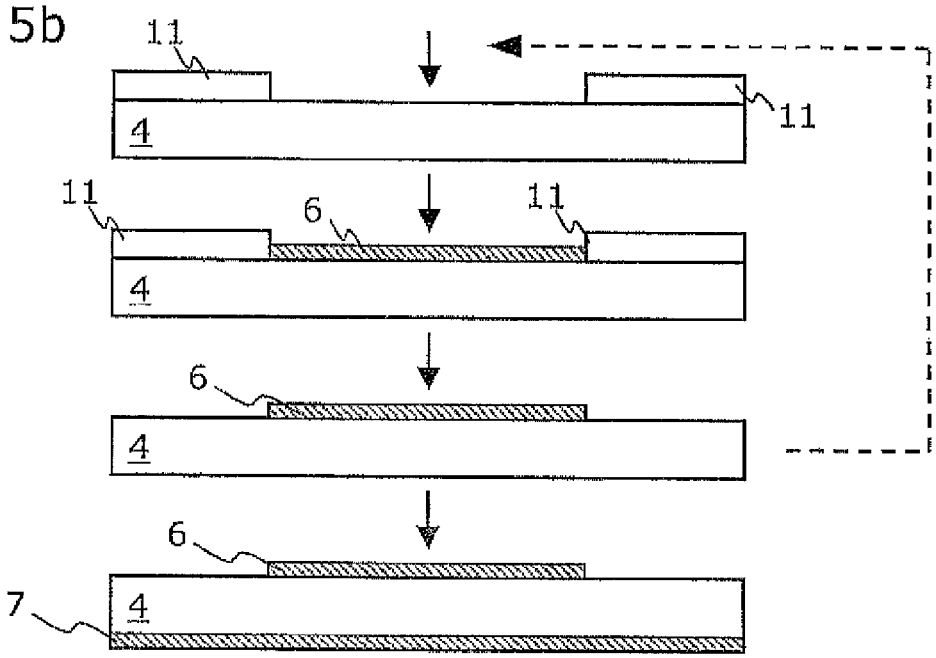

The invention will now be described in greater detail, using exemplary embodiments, in the following figures. These show:

FIG. 1: a schematic three-dimensional view of an embodiment of the disk according to the invention;

FIG. 2a-2b: a schematic cross-section through the embodiment according to the invention from FIG. 1;

FIG. 3: a schematic top view of the two individual disks of an embodiment of the disk according to the invention;

FIG. 4: a schematic cross-section through the individual disks according to the invention from FIG. 3;

FIG. 5a-5b: a schematic flow chart of an embodiment of the method according to the invention.

FIG. 1 shows a schematic three-dimensional view of an embodiment of the disk 1 according to the invention. A mirrored surface pattern 2, for example a logo or an advertising message, is formed on the side 13 of the disk 1 facing away from the eyes, by means of a mirrored region 5. The disk 1 comprises a first individual disk 3 and a second individual disk 4, whereby the two disks are connected with one another as a composite, for example glued, welded, or cemented.

FIG. 2a shows the disk 1 from FIG. 1 along the section line II-II. The disk 1 comprises a first individual disk 3 and a second individual disk 4, which form a composite with one another. A first mirrored region 5 is formed on the side 13 of the first individual disk 3 facing away from the eyes. A second mirrored region 6 is also situated on the side of the second individual disk 4 facing away from the eyes. A wearer of the disk 1 is situated on the side 12 of the second individual disk 4 facing the eyes, and looks through the two individual disks 3, 4. He therefore notices both mirrored regions 5, 6. An observer of the disk 1 is situated on the side 13 of the first individual disk 3 facing away from the eyes, and only notices the first mirrored region 5.

FIG. 2b: shows the exemplary embodiment according to the invention from FIG. 2a, whereby an overlap region 14 is provided between the first mirrored region 5 and the second mirrored region 6. In this case, the entire viewing surface of the disk is covered by the mirrored regions 5 and 6 even when looking at the disk from a slightly inclined angle.

FIG. 3 shows a schematic top view of the two individual disks 3, 4 of an embodiment of the disk 1 according to the invention. In this case, the mirrored regions 5 and 6 are structured in such a manner that their combination precisely results in the viewing surface of the disk 1. In other words, the second mirrored region 6 is the negative of the first mirrored region 5. Of course, more than two individual disks can also be provided, whereby the superimposition of all the mirrored regions results in the viewing surface of the disk.

FIG. 4 shows a schematic cross-section through the individual disks 3, 4 according to the invention from FIG. 3, whereby the individual disks are separated for reasons of better comprehensibility. The first individual disk 3 has a first mirrored region 5 on its side 13 facing away from the eyes, and an anti-reflective coating 8 on its side 12 facing the eyes. The second individual disk 4 also has a second mirrored region 6 on its side 13 facing away from the eyes, and a tinted coating 9 on its side 12 facing the eyes.

FIGS. 5a and 5b show a schematic flow chart of an embodiment of the method according to the invention. FIG. 5a shows the application of a mask 11 to the surface of a first individual disk 3 facing away from the eyes, application of a first mirrored surface coating 7 to the side of the first individual disk 3 facing away from the eyes; removal of the mask; and application of a whole-area anti-reflective coating 8 to the side of the first individual disk facing the eyes.

FIG. 5b shows the application of a mask 11 to the surface of a second individual disk 4 facing away from the eyes; application of a second mirrored surface coating 7 to the surface of the second individual disk 4 facing away from the eyes; removal of the mask 11; and application of a whole-area mirrored surface coating 7 to the side of the second individual disk 4 facing the eyes.

The last method step, that of connecting the first individual disk 3 with the second individual disk 4, by means of gluing, melting, or cementing, is not shown in this figure.

REFERENCE SYMBOL LIST 1 disk
2 mirrored coating pattern
3 first individual disk
4 second individual disk
5 first mirrored region
6 second mirrored region
7 mirrored surface coating
8 anti-reflective coating
9 tinted coating
10 fluorescent substances
11 mask 12 side facing the eyes/wearer side
13 side facing away from the eyes/observer side
14 overlap region

The invention claimed is:

1. A composite of multiple disks made of glass or plastic, suitable for allowing a view through the disk, on which mirrored surface patterns are provided, wherein the composite consists of first and second individual disks, the first individual disk including a first reflective mirrored region and the second individual disk including a second reflective mirrored region,
   wherein the second reflective mirrored region is a negative image of the first reflective mirrored region,
   wherein the composite is mounted in eyeglasses,
   wherein the first individual disk has the first reflective mirrored region on its side facing away from eyes of a person wearing the eyeglasses,
   wherein the first individual disk has a whole-area anti-reflective coating on its side facing the eyes of the person wearing the eyeglasses, and
   wherein the second individual disk has the second reflective mirrored region on its side facing away from the eyes of the person wearing the eyeglasses.

2. The composite according to claim 1, wherein the reflective mirrored regions of the two individual disks do not overlap each other, and wherein a surface of all of the reflective mirrored regions combined covers an entire viewing surface of the disk.

3. The composite according to claim 1, wherein the reflective mirrored regions are situated on the sides of the individual disks facing away from eyes of a person wearing eyeglasses which comprise the disk.

4. The composite according to claim 1, wherein at least one of the individual disks has a whole-area anti-reflective coating on one side.

5. The composite according to claim 1, wherein the composite is mounted in eyeglasses and wherein at least one of the individual disks has a whole-area anti-reflective coating on its side facing eyes of a person wearing the eyeglasses.

6. The composite according to claim 1, wherein the individual disks are glued, melted, or cemented to one another.

7. The composite according to claim 1, wherein the reflective mirrored region of a first individual disk differs from the reflective mirrored region of a second individual disk in terms of their mirrored surface color and/or mirrored surface intensity.

8. The composite according to claim 1, wherein the composite is mounted in eyeglasses and wherein the individual disks have whole-area mirrored surface coatings on their sides facing eyes of a person wearing the eyeglasses, the whole-area mirrored surface coatings having a maximum of 50% of an intensity of the mirrored surface of the mirrored regions.

9. The composite according to claim 1, wherein the individual disks are tinted and/or provided with a tinted coating on a side having the reflective mirrored regions thereon.

10. The composite according to claim 1, wherein the disks have one or more of mirrored surface coatings, anti-reflective coatings or tinted coatings.

11. The composite according to claim 1, wherein the reflective mirrored regions of the individual disks overlap in a region amounting to 1% to 5% of a total viewing surface.

12. The composite according to claim 1, wherein the first reflective mirrored region covers less than an entire first cross-section of the first individual disk, wherein a remaining portion of the first cross-section of the first individual disk consists of a non-reflective region, wherein the second reflective mirrored region covers less than an entire first cross-section of the second individual disk, and wherein a remaining portion of the first cross-section of the second individual disk consists of a non-reflective region.

13. A method for the production of a composite disk made of glass or plastic, wherein the method comprises the following steps:
   a. application of a mask to a first surface of a first individual disk;
   b. application of a reflective mirrored surface coating to the first surface of the first individual disk;
   c. removal of the mask;
   d. application of a whole-area anti-reflective coating to a second surface of the first individual disk, the second surface being disposed opposite from the first surface;
   e. application of a mask to a first surface of a second individual disk;
   f. application of a reflective mirrored surface coating to the first surface of a second individual disk;
   g. removal of the mask;
   h. application of a whole-area mirrored surface coating to a second surface of the second individual disk, the second surface being disposed opposite from the first surface; and
   i. connection of the first individual disk and the second individual disk via gluing, melting, or cementing;
   wherein the composite consists of the first and second individual disks, the first individual disk including a first reflective mirrored region and the second individual disk including a second reflective mirrored region,
   wherein the second reflective mirrored region is a negative image of the first reflective mirrored region,
   wherein the composite is mounted in eyeglasses,
   wherein the first individual disk has the first reflective mirrored region on its side facing away from eyes of a person wearing the eyeglasses,
   wherein the first individual disk has a whole-area anti-reflective coating on its side facing the eyes of the person wearing the eyeglasses, and
   wherein the second individual disk has the second reflective mirrored region on its side facing away from the eyes of the person wearing the eyeglasses.

14. The method according to claim 13, wherein one or more tinted coatings is/are applied before application of the reflective mirrored surface coatings or anti-reflective coatings.

* * * * *